Aug. 2, 1960 H. J. WENGER 2,947,556
VERTICALLY ADJUSTABLE STANDARD FOR MUSIC RACKS
Filed March 16, 1959
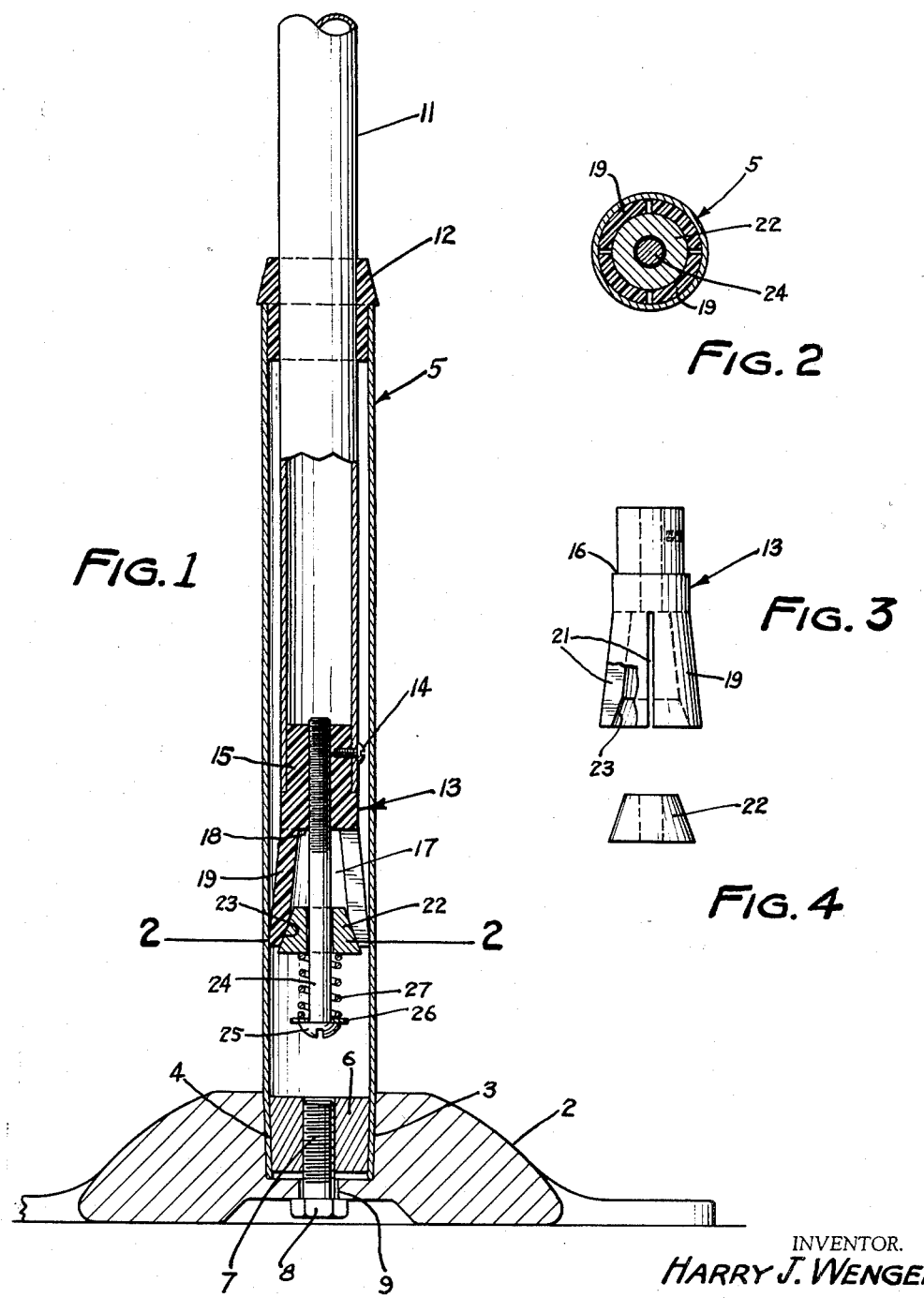
INVENTOR.
HARRY J. WENGER
BY Moore, White & Burd
ATTORNEYS

United States Patent Office 2,947,556
Patented Aug. 2, 1960

2,947,556
VERTICALLY ADJUSTABLE STANDARD FOR MUSIC RACKS

Harry J. Wenger, Owatonna, Minn.

Filed Mar. 16, 1959, Ser. No. 799,556

2 Claims. (Cl. 287—58)

This invention relates to new and useful improvements in vertically adjustable standards, and more particularly to such a device adapted to support a music rack, or the like.

The present standard is an improvement over the form shown in my pending application, Serial No. 760,981, filed September 15, 1958. Music racks, such as used by the members of a band, or of a choral group, including the director, must desirably be adapted for vertical adjustment for the convenience of the various users. The mechanism for retaining such a stand in adjusted position should be readily operable by the user, and preferably without the use of tools, etc.

The novel standard herein disclosed comprises two telescopic members, a fixed member and a movable member which is axially adjustable in the fixed member. A novel friction device is provided between the two telescopic members for retaining them in adjusted position. The friction device is also automatically operable to compensate for wear between the two telescopic members of the standard and to assure uniform frictional engagement between said members under all conditions of use. In addition, it also compensates for variations in the inside diameter or bore of the base member of the composite standard.

A further object is to provide a vertically adjustable standard of the class described comprising a non-metallic friction plug carried by the upper movable member and frictionally engaging the wall of the bore of the lower tubular member in such manner as to maintain substantially a constant uniform frictional engagement with the wall of the bore of the lower tubular member over a long period of time.

A further object of the present invention resides in the unique construction of the friction element which has embodied therein means for automatically expanding the skirt portion of said element thereby to maintain a constant frictional engagement with the wall of the base member and, at the same time, permitting the upper member of the stand to be readily shifted up or down as may be desired without the manipulation of screws or other securing elements as is common in many devices of this general type.

A further and more specific object of the invention resides in the specific construction of the friction element which is constructed of nylon and has a tapered bore in its bottom end to form, in effect, a depending outwardly-flared skirt the lower peripheral edge of which frictionally engages the wall of the base tube and is retained in frictional engagement therewith by a frustrum-shaped plug having a spring associated therewith for constantly urging the plug into the tapered bore in said skirt, thereby to expand the skirt into frictional engagement with the wall of the fixed member of the stand.

Other features of the invention reside in the specific construction of the nylon friction element which has a depending outwardly-flared skirt which is vertically slitted at spaced intervals around its circumference to render the skirt readily expandable; in the means provided in the friction element for automatically expanding the wall of its skirt to maintain the desired frictional engagement between said skirt and the wall of the base tube; and in the provision of the frustrum-shaped plug adjustably secured in the tapered bore in the skirt by a screw having its upper end threadedly received in the upper end of the friction element and carrying at its lower end a spring having one end bearing against the frustrum-shaped plug and its opposite end against the head of the screw, whereby the spring constantly urges the plug into the bore in the lower end of the friction element thereby to automatically expand its skirt into controlled frictional engagement with the wall of the base tube or element, as hereinbefore stated.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a vertical sectional view of the lower portion of a standard showing the invention embodied therein;

Figure 2 is a horizontal sectional view on the line 2—2 of Figure 1;

Figure 3 is an elevational view of the nylon element detached from the standard; and Figure 4 is a similar view of the frustrum-shaped plug detached from the standard.

The novel vertically adjustable standard herein disclosed is shown comprising a base having a tapered socket 3 therein adapted to receive the lower tapered end 4 of a tubular member or base tube 5. A plug 6 is inserted into the lower tapered end tube 5, and has a threaded socket therein adapted to receive the threaded terminal 7 of a screw 8. Screw 8 passes through a restricted aperture 9 in the bottom of the base 2. The plug 6 is tapered to correspond to the taper of the inner wall surface of the tube terminal 4, whereby when screw 8 is tightened it securely anchors the lower end of tube 5 to the base, as will be understood.

Slidably mounted within the base tube 5 is a relatively smaller tube member 11. The upper end portion of tube member 11 is slidably supported in a bushing 12 fixedly secured in the upper end of the base tube 5. A suitable rack (not shown) is supported on the upper end of tube 11, as will be understood.

One of the important features of the present invention resides in the unique construction of the friction device provided at the lower end of the vertically adjustable inner tube member 11, whereby said member will retain its adjusted position without the manipulation of screws or other securing elements. As best shown in Figure 1, a friction element, generally designated by the numeral 13, is fixedly secured in the lower end of the inner tube 11 by such means as a screw or pin 14. The body portion 15 of the friction element 13 preferably has an annular shoulder 16 adapted to engage the lower edge of the inner tube 11, thereby to limit the inward movement of said body 15 into said tube.

It will be noted that a considerable portion of the friction element 13 protrudes from the lower end of tube 11 and that said protruding end has an axial tapered bore 17 therein which terminates in a bottom 18, thereby to provide an annular skirt 19 the lower peripheral edge portion of which frictionally engages the wall of the lower or base tube 5. To permit the wall of the skirt 19 to be freely expanded into engagement with the wall of tube 5, the skirt is vertically slitted, as indicated at 21 in Figure 3, from its lower edge to the bottom 18 of the tapered bore 17.

A frustrum-shaped plug 22 is fitted into the lower end portion of skirt 19 and engages a correspondingly-tapered wall portion 23 of the lower end of the skirt, as shown in Figure 1. The plug 22 has an axial aperture therein for receiving a screw 24, the upper end of which is received in threaded engagement with a threaded aperture provided in the body 15 of the friction element 13, as best shown in Figure 1.

Screw 24 has a head 25 at its lower end and a washer 26 is seated thereon. A compression spring 27 is interposed between the washer 26 and the lower end of the plug 22 and constantly urges the plug upwardly into the lower end of the skirt, as will be understood. It will be noted that the plug 22 is mounted for relative sliding movement on the screw 24, whereby it may readily be forced into the tapered bore in the lower end of the friction element to compensate for wear in the movable parts, as will be understood. Relative rotation of the screw 24 will vary the tension in the spring 24 and, therefore, the frictional engagement of the friction element with the wall of the base member 5.

Nylon has the inherent characteristic of being "self-lubricating." The friction element 13 and bushing 12 are, therefore, made of such material so that the operator may freely raise or lower a music rack (not shown) by simply grasping the upper tube member 11, as will be understood.

The novel invention herein disclosed has been found extremely practical and efficient when embodied in a standard for supporting a music rack, a microphone, a flood light, or some other device which may occasionally require to be vertically adjusted relative to the floor. It may readily be adjusted to any desired elevation within its range of vertical movement, without the use of tools, and with the assurance that it will retain its adjusted position.

The self-adjusting frustrum-shaped plug 22 automatically adjusts the frictional engagement of the friction element 13 to the bore of the base tube 5 so that such frictional engagement may be substantially uniform at all times.

The standard may readily be assembled in the following manner: The lower end of the upper tube member 11, including the friction element 13, is first inserted into the upper end of the base tube before the bushing 12 is secured in the base tube 5. After the upper vertically movable member has been inserted into the base tube 5, the bushing 12 is inserted into the upper end of the base tube 5 and secured therein. Screw 24 may then be adjusted by inserting a screw driver through the hole 9 in the base 2 and through the threaded socket in the plug 6, after removal of the screw 8. When the friction element has been adjusted to obtain the desired frictional engagement between the friction element and the wall of the base tube 5, screw 8 may be replaced, as shown in Figure 1, thereby to seal the friction element in the operative position within the standard.

The invention may be embodied in other specific forms without departing from the essential characteristics thereof. Hence, the present embodiments are, therefore, to be considered in all respects merely as being illustrative and not as being restrictive, the scope of the invention being indicated by the appended claims rather than by the foregoing description, and all modifications and variations as fall within the meaning and purview and range of equivalency of the appended claims are, therefore, intended to be embraced therein.

I claim as my invention:

1. A music stand comprising inner and outer telescopic members, a plug secured to the lower end of said inner member and having a split skirt extending below said inner member into the bore of said outer telescopic member, said split skirt having an axial tapered bore therein, a skirt-expanding element in said tapered bore, said element having an axial bore therein, a screw traversing the bore in said element and having its upper end received in threaded engagement with said plug, said screw having a seat at its lower end, and resilient means interposed between said element and said seat for exerting a yielding pressure against said element to expand said skirt into frictional engagement with the bore of said outer telescopic member, when said screw is rotated, thereby to frictionally secure said inner telescopic member against relative axial movement in said outer telescopic member, under normal operating condition.

2. A music stand comprising inner and outer telescopic tubular members, a non-metallic plug secured to the lower end of said inner tubular member and having a split skirt extending below said inner member into engagement with the bore of said outer tubular member, said split skirt having an axial tapered bore therein, a tapered skirt-expanding plug in said tapered bore, said skirt-expanding plug having an axial bore therein, a screw traversing the bore in said skirt-expanding plug and having its upper end received in threaded engagement with said non-metallic plug, said screw having a head at its lower end, a spring coiled about said screw and having one end seated against said head and its opposite end against the skirt-expanding plug, said spring constantly urging said skirt-expanding plug in a direction to expand said skirt into frictional engagement with the bore in said outer tubular member, relative rotation of said screw varying the outward pressure exerted against said skirt to vary the frictional engagement between said skirt and the bore of said outer tubular member.

References Cited in the file of this patent

UNITED STATES PATENTS

| | | |
|---|---|---|
| 448,259 | Reynolds | Mar. 17, 1891 |
| 1,418,329 | Schade | June 6, 1922 |
| 2,643,143 | Bergquist | June 23, 1953 |
| 2,816,769 | Noble | Dec. 17, 1957 |
| 2,869,237 | Berge | Jan. 20, 1959 |